United States Patent
Arase et al.

(10) Patent No.: US 7,847,001 B2
(45) Date of Patent: Dec. 7, 2010

(54) LIQUID FLUOROPOLYMER COMPOSITION AND PROCESS FOR PRODUCING CROSSLINKED FLUOROCHEMICAL

(75) Inventors: Takuya Arase, Settsu (JP); Masayoshi Tatemoto, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 12/629,817

(22) Filed: Dec. 2, 2009

(65) Prior Publication Data

US 2010/0080931 A1  Apr. 1, 2010

Related U.S. Application Data

(63) Continuation of application No. 10/580,964, filed as application No. PCT/JP2004/017889 on Dec. 1, 2004, now abandoned.

(30) Foreign Application Priority Data

Dec. 1, 2003  (JP)  ............... 2003-402328

(51) Int. Cl.
*C08K 5/41* (2006.01)
(52) U.S. Cl. ............... 524/167; 524/544; 524/755; 524/805; 521/28
(58) Field of Classification Search ............... 524/167, 524/544, 755, 805; 521/28
See application file for complete search history.

(56) References Cited

U.S. PATENT DOCUMENTS

| | | | |
|---|---|---|---|
| 3,282,875 A | 11/1966 | Connolly | |
| 4,433,082 A | 2/1984 | Grot | |
| 4,453,991 A | 6/1984 | Grot | |
| 6,939,581 B2 | 9/2005 | Sanguineti et al. | |
| 7,074,841 B2 * | 7/2006 | Yandrasits et al. | .......... 522/156 |
| 7,265,162 B2 * | 9/2007 | Yandrasits et al. | .......... 522/156 |
| 7,435,498 B2 * | 10/2008 | Yandrasits et al. | ............ 429/33 |
| 2005/0228127 A1 | 10/2005 | Tatemoto et al. | |

FOREIGN PATENT DOCUMENTS

| | | |
|---|---|---|
| EP | 1126537 A1 | 8/2001 |
| JP | 41-7949 | 4/1966 |
| JP | 54-52690 | 4/1979 |
| JP | 54-107889 | 8/1979 |
| JP | 60-133031 | 7/1985 |
| JP | 61-276828 | 12/1986 |
| JP | 2000-18811 A | 7/2000 |
| JP | 2000-188013 | 7/2000 |
| JP | 2000-188111 A | 7/2000 |
| JP | 2001-29800 A | 2/2001 |
| JP | 2001-504872 A | 4/2001 |
| JP | 2001-226436 A | 8/2001 |
| JP | 2002-53619 | 2/2002 |
| JP | 2002-216804 A | 8/2002 |
| JP | 2003-128833 A | 5/2003 |
| WO | 98/16581 A1 | 4/1998 |
| WO | 2004/018257 A1 | 3/2004 |
| WO | 2004/018527 A1 | 3/2004 |

* cited by examiner

*Primary Examiner*—Bernard Lipman
(74) *Attorney, Agent, or Firm*—Sughrue Mion, PLLC

(57) ABSTRACT

A fluoropolymer liquid composition including a fluoropolymer liquid (A) which includes a liquid medium and a crosslinkable functional group-containing crosslinkable fluoropolymer. The fluoropolymer liquid (A) is a fluoropolymer liquid dispersion (AD) having, dispersed in a liquid dispersion medium, particles of a crosslinkable fluoropolymer (PD) containing acid/acid salt groups or organic groups capable of undergoing hydrolysis and thus being converted to carboxyl groups, or a fluoropolymer solution (AS) having, dissolved in a fluorosolvent or an alcohol/water mixed solvent, a crosslinkable fluoropolymer (PS) containing acid/acid salt groups or acid/acid salt groups precursors. Further, the crosslinkable functional group is a cyano group, —I or —Br.

51 Claims, No Drawings

LIQUID FLUOROPOLYMER COMPOSITION AND PROCESS FOR PRODUCING CROSSLINKED FLUOROCHEMICAL

CROSS-REFERENCE TO RELATED APPLICATIONS

This application is a Continuation of U.S. patent application Ser. No. 10/580,964, which is a 371 of PCT Application No. PCT/JP2004/017889 filed Dec. 1, 2004 and which claims benefit of JPA No. 2003-402328 filed Dec. 1, 2003. The above-noted applications are incorporated herein by reference in their entirety.

TECHNICAL FIELD

This invention relates to a fluoropolymer liquid composition and to a method of producing a fluorine-containing cured article.

BACKGROUND ART

Fluorine-containing electrolyte membranes are mainly used in solid polymer fuel cells currently attracting attention. However, they have problems. For improving the power generating characteristics of fuel cells, such means is available as increasing the ion exchange capacity of the electrolyte membrane or diminishing the membrane thickness, for instance. In either case, however, decreases in mechanical strength will surely result. Since the membrane is firmly compressed during use, the membrane undergoes deformation and degradation due to the creep phenomenon, or is deteriorated due to repeated expansion and shrinkage on the occasions of starting and stopping power generation and, in extreme cases, pinholes are made, allowing mixing of hydrogen and oxygen with each other.

For preventing fluorine-containing electrolyte membranes from being deteriorated, it has been proposed that the electrolyte membranes be crosslinked and thus converted to cured membranes (cf. e.g. Patent Document 1: Japanese Kokai Publication S60-133031; Patent Document 2: Japanese Kokai Publication S54-107889; Patent Document 3: Japanese Kokai Publication S54-52690; Patent Document 4: Japanese Kokai Publication S61-276828; Patent Document 5: Japanese Kokai Publication 2000-188013; Patent Document 6: Japanese Kokai Publication 2002-53619; Patent Document 7: Japanese Kokai Publication 2003-128833). As for the method of obtaining cured membranes, a method is known which comprises blending a resin with a crosslinking agent and subjecting the mixture to extrusion molding. However, there are problems; the crosslinking reaction already occurs in the molding machine and, therefore, it is difficult to control the crosslinking reaction, hence it is difficult to manufacture membranes constant in quality.

Also known as a method of producing fluorine-containing cured electrolyte membranes is the method comprising blending a resin with a crosslinking agent and subjecting the mixture to hot press molding (cf. e.g. Patent Document 6). However, this method has a problem: it is difficult to obtain membranes large in size, so that batch production is unavoidable and mass production is difficult to make.

Another known method of producing fluorine-containing cured electrolyte membranes comprises impregnating perfluoro type sulfonyl fluoride membranes made in the conventional manner with a crosslinking agent and curing them by heating or exposure to high energy radiation (cf. e.g. Patent Document 5). However, this document does not disclose the crosslinking of cast membranes formed from a solution, following by heating, for instance. Further, the crosslinking agent is generally a large molecule and it is difficult for that agent to uniformly penetrate into the membranes; it is a problem that uniformly cured membranes are thus difficult to obtain.

A further known method of producing fluorine-containing cured electrolyte membranes comprises blending a $-SO_2F$ type dispersion with a crosslinking agent and, after membrane formation by casting, curing the membranes by heating (cf. e.g. Patent Document 7). However, the $-SO_2F$ type dispersion contains the emulsifier and/or initiator residue, which produces a problem, namely deteriorates the characteristics of the membranes obtained.

DISCLOSURE OF INVENTION

Problems which the Invention is to Solve

In view of the above-discussed state of the art, it is an object of the present invention to provide a liquid composition which comprises an acid/acid salt group-containing polymer and from which cured articles excellent in mechanical characteristics and undergoing only slight dimensional changes depending on the moisture content can be produced by application thereof to a substrate or impregnation of a porous material therewith.

Means for Solving the Problems

The present invention relates to a fluoropolymer liquid composition comprising a fluoropolymer liquid (A) which comprises a liquid medium and a crosslinkable functional group-containing crosslinkable fluoropolymer, wherein said fluoropolymer liquid (A) is a fluoropolymer liquid dispersion (AD) having, dispersed in a liquid dispersion medium, particles of a crosslinkable fluoropolymer (PD) containing acid/acid salt groups or organic groups capable of undergoing hydrolysis and thus being converted to carboxyl groups, or a fluoropolymer solution (AS) having, dissolved in a fluorosolvent or an alcohol/water mixed solvent, a crosslinkable fluoropolymer (PS) containing acid/acid salt groups or acid/acid salt groups precursors;

said acid/acid salt groups are sulfonic acid groups, carboxyl groups or groups of the formula $-SO_2NR^2R^3$, $-SO_3NR^4R^5R^6R^7$, $-SO_3M^1_{1/L}$, $-COONR^8R^9R^{10}R^{11}$ or $-COOM^2_{1/L}$, wherein $R^2$ represents a hydrogen atom or $M^5_{1/L}$, $R^3$ represents an alkyl group or an sulfonyl-containing group, $R^4$, $R^5$, $R^6$, $R^7$, $R^8$, $R^9$, $R^{10}$ and $R^{11}$ are the same or different and each represents a hydrogen atom or an alkyl group, and $M^1$, $M^2$ and $M^5$ each represents a metal having a valence of L, said metal having a valence of L being a metal belonging to the group 1, 2, 4, 8, 11, 12 or 13 of the periodic table; and said acid/acid salt groups precursors are $-SO_2F$, $-SO_2NR^{22}R^{23}$ (wherein $R^{22}$ and $R^{23}$ are the same or different and each represents an alkyl group) or organic groups capable of undergoing hydrolysis and thus being converted to carboxyl groups.

The present invention relates to a method of producing a fluorine-containing cured article, in which the fluoropolymer liquid composition mentioned above is applied to a substrate or a porous material is immersed in said composition, the liquid medium is then removed and a crosslinking treatment is carried out to produce said fluorine-containing cured article.

The present invention relates to a method of producing a fluorine-containing cured article, in which the fluoropolymer liquid composition mentioned above is applied to a substrate or a porous material is immersed in said composition, the liquid medium is then removed and a crosslinking treatment is carried out using a peroxide compound as a crosslinking reaction initiator to produce said fluorine-containing cured article.

In the later method of producing a fluorine-containing cured article, the fluoropolymer liquid composition to be used may be one in which the crosslinkable functional group is —I or —Br and a polyfunctional unsaturated compound is contained as the crosslinking agent (B).

In the following, the present invention is described in detail.

The fluoropolymer liquid composition of the invention comprises a fluoropolymer liquid (A), which in turn comprises a liquid medium and a crosslinkable functional group-containing crosslinkable fluoropolymer.

The liquid medium is one of the liquid dispersion medium described later herein, or a fluorosolvent or an alcohol/water mixed solvent.

The fluoropolymer liquid (A) is a fluoropolymer liquid dispersion (AD) having, dispersed in a liquid dispersion medium, particles of a crosslinkable fluoropolymer (PD) containing acid/acid salt groups or organic groups capable of undergoing hydrolysis and thus being converted to carboxyl groups, or a fluoropolymer solution (AS) having, dissolved in a fluorosolvent or an alcohol/water mixed solvent, a crosslinkable fluoropolymer (PS) containing acid/acid salt groups or acid/acid salt groups precursors.

The acid/acid salt groups are sulfonic acid groups, carboxyl groups or acid groups of the formula —$SO_2NHR^3$ (wherein $R^3$ represents an alkyl group or a sulfonyl-containing group), or acid salts groups of the formula —$SO_3NR^4R^5R^6R^7$, —$SO_3M^1{}_{1/L}$, —$SO_2NM^5{}_{1/L}R^3$, —$COONR^8R^9R^{10}R^{11}$ or —$COOM^2{}_{1/L}$ (wherein $R^3$ is as defined above, $R^4$, $R^5$, $R^6$, $R^7$, $R^8$, $R^9$, $R^{10}$ and $R^{11}$ are the same or different and each represents a hydrogen atom or an alkyl group, and $M^1$, $M^2$ and $M^5$ each represents a metal having a valence of L; said metal having a valence of L is a metal belonging to the group 1, 2, 4, 8, 11, 12 or 13 of the periodic table). The acid/acid salt groups precursors include —$SO_2F$, —$SO_2NR^{22}R^{23}$ (wherein $R^{22}$ and $R^{23}$ are the same or different and each represents an alkyl group; $R^{23}$ may be —$R^{28}SO_2F$ or the like group mentioned later herein) or organic groups capable of undergoing hydrolysis and thus being converted to carboxyl groups.

The sulfonyl-containing group represented by $R^3$ is a sulfonyl group-containing fluoroalkyl group and includes, among others, fluoroalkylsulfonyl groups which may terminally be substituted. As the fluoroalkylsulfonyl groups, there may be mentioned, for example, —$SO_2R_f^6Z^2$ groups (wherein $R_f^6$ represents a fluoroalkylene group and $Z^2$ represents an organic group). As the organic group, there may be mentioned, for example, —$SO_2F$, —$SO_3H$ and —$SO_3M^1{}_{1/L}$, and these may be indefinitely repeated to give —$SO_2(NR^{27}SO_2R_f^6SO_2)_kNR^{27}SO_2$— groups (wherein k represents an integer of not smaller than 1, $R_f^6$ represents a fluoroalkylene group; $R^{27}$ represents an alkyl group, a hydrogen atom or a metal having a valence of L), for instance, or the organic group may also be —$SO_2(NR^{27}SO_2R_f^6SO_2)_kNR^{27}SO_2F$, —$SO_2(NR^{27}SO_2R_f^6SO_2)_kNR^{27}SO_3X$ (wherein k represents an integer not smaller than 1 but not greater than 100, $R^{27}$ and $R_f^6$ are as defined above and X represents a hydrogen atom or a metal having a valence of L), or the like.

The organic groups capable of undergoing hydrolysis and thus being converted to carboxyl groups are preferably —$COOR^{12}$ ($R^{12}$ representing an alkyl group) or —$CONR^{24}R^{25}$ ($R^{24}$ and $R^{25}$ being the same or different and each representing an alkyl group or a hydrogen atom).

The alkyl group represented by $R^3$, $R^4$, $R^5$, $R^6$, $R^7$, $R^8$, $R^9$, $R^{10}$, $R^{11}$, $R^{12}$, $R^{22}$, $R^{23}$, $R^{24}$, $R^{25}$ and/or $R^{27}$ includes alkyl groups containing 1 to 4 carbon atoms such as methyl, ethyl, propyl and butyl. Among them, methyl or ethyl is preferred. The group $R^{23}$ may be, for example, —$R^{28}SO_2F$ or such an indefinite repetition as —$SO_2(NR^{29}SO_2R_f^6SO_2)_kNR^{29}SO_2$— (wherein k represents an integer of not smaller than 1, $R_f^6$ represents a fluoroalkylene group, $R^{28}$ represents an alkylene group and $R^{29}$, like $R^{22}$, represents an alkyl group), or —$SO_2(NR^{27}SO_2R_f^6SO_2)_kNR^{27}SO_2F$ (wherein k represents an integer not smaller than 1 but not greater than 100 and $R^{27}$ and $R_f^6$ are as defined above).

The fluoropolymer liquid (A) is preferably a fluoropolymer liquid dispersion (AD) comprising a crosslinkable fluoropolymer (PD) containing carboxyl groups, acid/acid salt groups or organic groups capable of undergoing hydrolysis and thus being converted to carboxyl groups, or a fluoropolymer solution (AS) comprising a crosslinkable fluoropolymer (PS) containing carboxyl groups, acid/acid salt groups or acid/acid salt groups precursors. More preferably, it is a fluoropolymer liquid dispersion (AD) comprising a crosslinkable fluoropolymer (PD) containing acid salt groups, still more preferably a fluoropolymer aqueous dispersion (ADA) comprising a crosslinkable fluoropolymer (PD) containing —$SO_3M^1{}_{1/L}$ groups ($M^1$ being as defined above).

The above-mentioned acid/acid salt groups, the acid/acid salt groups precursors, and the organic groups capable of undergoing hydrolysis and thus being converted to carboxyl groups are each bound to a fluoroether side chain represented by the general formula (I):

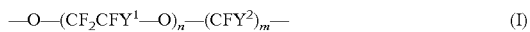
$$—O—(CF_2CFY^1—O)_n—(CFY^2)_m— \quad (I)$$

wherein $Y^1$ represents a fluorine or chlorine atom or a perfluoroalkyl group, n represents an integer of 0 to 3, the n atoms/groups of $Y^1$ may be the same or different, $Y^2$ represents a fluorine or chlorine atom, m represents an integer of 1 to 5, and the m atoms of $Y^2$ may be the same or different. The fluoroether side chain is preferably bound, via ether bonding, to a carbon atom constituting a perfluoroethylene unit in the main chain of the crosslinkable fluoropolymer. The perfluoroalkyl group mentioned above preferably contains 1 to 3 carbon atoms.

The crosslinkable fluoropolymer is preferably a fluoropolymer precursor obtained by polymerizing a fluorovinyl ether derivative represented by the general formula (II):

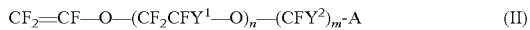
$$CF_2=CF—O—(CF_2CFY^1—O)_n—(CFY^2)_m-A \quad (II)$$

wherein $Y^1$ represents a fluorine or chlorine atom or a perfluoroalkyl group, n represents an integer of 0 to 3, the n atoms/groups of $Y^1$ may be the same or different; $Y^2$ represents a fluorine or chlorine atom, m represents an integer of 1 to 5, the m atoms of $Y^2$ may be the same or different, and A represents —$SO_2X$, —$COOM^3{}_{1/L}$ or an organic group capable of undergoing hydrolysis and thus being converted to a carboxyl group; X represents a halogen atom, —$OM^4{}_{1/L}$, —$NR^{13}R^{14}$ or —$ONR^{15}R^{16}R^{17}R^{18}$ (wherein $R^{13}$ and $R^{14}$ are the same or different and each represents a hydrogen atom, an alkali metal, an alkyl group or a sulfonyl-containing group, $M^3$ and $M^4$ each represents a metal having a valence of L, and $R^{15}$, $R^{16}$, $R^{17}$ and $R^{18}$ are the same or different and each represents a hydrogen atom or an alkyl group containing 1 to 4 carbon atoms), or one derived from the fluoropolymer precursor mentioned above.

When the crosslinkable fluoropolymer is such a fluoropolymer precursor as mentioned above, the groups —SO$_2$X (X is —OM$^4{}_{1/L}$, —NR$^{13}$R$^{14}$ or —ONR$^{15}$R$^{16}$R$^{17}$R$^{18}$, M$^4$ is as defined above and R$^{13}$, R$^{14}$, R$^{15}$, R$^{16}$, R$^{17}$ and R$^{18}$ are as defined above (—SO$_2$X corresponding to the acid/acid salt group)) and —COOM$^3{}_{1/L}$ in the above general formula (II) are the same as the acid/acid salt groups of the above-mentioned crosslinkable fluoropolymer.

The above-mentioned "one derived from the fluoropolymer precursor" is one obtained by hydrolyzing the fluoropolymer precursor in the presence of water, as described later herein, or one obtained by interchanging the alkali metal or the metal of valence L in the sulfonyl-containing group as represented by M$^3$ or M$^4$ or R$^{13}$ and/or R$^{14}$ in the general formula (II), which the fluoropolymer precursor has, with another metal or cation or the like.

The fluorovinyl ether derivative mentioned above is represented by the general formula (II) when n represents an integer of 0 to 3. The integer n is preferably 0 or 1. The symbol m in the general formula (II) represents an integer of 1 to 5. The integer m is preferably 2.

The symbol Y$^1$ in the general formula (II) represents a fluorine or chlorine atom or a perfluoroalkyl group, and the n groups of Y$^1$ may be the same or different. The perfluoroalkyl group is not particularly restricted but includes, among others, perfluoroalkyl groups containing 1 to 3 carbon atoms, such as trifluoromethyl group and pentafluoroethyl group.

The symbol Y$^2$ in the general formula (II) preferably represents a fluorine or chlorine atom, and the m atoms of Y$^2$ may be the same or different. In the general formula (II), Y$^1$ is preferably a trifluoromethyl group, and Y$^2$ is preferably a fluorine atom.

More preferably, the above fluorovinyl ether derivative is one represented by the general formula (II) wherein Y$^1$ is a trifluoromethyl group, Y$^2$ is a fluorine atom, n is 0 or 1 and m is 2.

The fluoropolymer precursor mentioned above is preferably an at least binary copolymer obtained by polymerizing the above-mentioned fluorovinyl ether derivative and a fluoroethylenic monomer.

When the fluoropolymer precursor is such an at least binary copolymer, the composition ratio between the fluorovinyl ether derivative and fluoroethylenic monomer is preferably 1:99 to 50:50, more preferably 5:95 to 30:70.

The fluoroethylenic monomer is not particularly restricted provided that it contains a vinyl group. It is different from the fluorovinyl ether derivative mentioned above.

As the fluoroethylenic monomer, there may be mentioned, for example, haloethylenic monomers represented by the general formula:

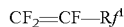

$CF_2=CF-Rf^1$ wherein Rf$^1$ represents a fluorine or chlorine atom, —Rf$^2$ or —ORf$^2$ in which Rf$^2$ represents a straight or branched fluoroalkyl group containing 1 to 9 carbon atoms which may optionally contain an ether oxygen atom(s), and hydrogen-containing fluoroethylenic monomers represented by the general formula:

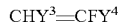

$CHY^3=CFY^4$ wherein Y$^3$ represents a hydrogen or fluorine atom and Y$^4$ represents a hydrogen, fluorine or chlorine atom, —Rf$^3$ or —ORf$^3$ in which Rf$^3$ represents a straight or branched fluoroalkyl group containing 1 to 9 carbon atoms which may optionally contain an ether oxygen atom(s).

The fluoroethylenic monomer preferably comprises at least one selected from the group consisting of $CF_2=CF_2$, $CH_2=CF_2$, $CF_2=CFCl$, $CF_2=CFH$, $CH_2=CFH$, $CF_2=CFCF_3$ and fluorovinyl ethers represented by $CF_2=CF-O-Rf^4$ (in which Rf$^4$ represents a fluoroalkyl group containing 1 to 9 carbon atoms or a fluoropolyether group containing 1 to 9 carbon atoms. The group Rf$^4$ in the above fluorovinyl ether is preferably a perfluoroalkyl group containing 1 to 3 carbon atoms.

The fluoroethylenic monomer is preferably a perhaloethylenic monomer, in particular a perfluoroethylenic monomer, more preferably $CF_2=CF_2$ As the fluoroethylenic monomer, one or two or more species can be used.

The above-mentioned crosslinkable fluoropolymer can be produced by any of the known methods of polymerization, such as solution polymerization, emulsion polymerization and suspension polymerization.

The crosslinkable fluoropolymer may be a polymer produced by seeded polymerization.

When it is one containing sulfonic acid groups or carboxylic groups or the above-mentioned sulfonic acid salt groups or carboxylic salt groups, the crosslinkable fluoropolymer is preferably one obtained by hydrolyzing the —SO$_2$X$^1$ (X$^1$ representing a halogen atom) or —COZ$^1$ (Z$^1$ representing an alkoxyl group) group, which the fluoropolymer precursor has, in the presence of water.

As the alkoxyl group in —COZ$^1$, there may be mentioned alkoxyl groups containing 1 to 4 carbon atoms, such as methoxy, ethoxy, propoxy and butoxy groups. Among them, methoxy or ethoxy group is preferred.

The hydrolysis is carried out by adding an alkali, preferably an aqueous solution of an alkali. As the alkali may be an alkali generally used for hydrolysis, for example, the hydroxide or carbonate of an alkali metal or alkaline earth metal. The hydroxide includes, among others, sodium hydroxide, potassium hydroxide and lithium hydroxide, and the carbonate includes sodium carbonate, sodium hydrogen carbonate and so forth.

The hydrolysis is generally carried out at ordinary temperature to 130° C. for 1 minute to 10 hours and, for example, when the acid/acid salt group precursor which the fluoropolymer precursor has is —SO$_2$F, the hydrolysis is generally carried out at 80° C. to 100° C. for 10 minutes to 5 hours.

The crosslinkable fluoropolymer contains crosslinkable functional groups.

The crosslinkable functional groups are groups consumed in the crosslinking reaction. The "crosslinking" is the formation of crosslinkage bonds. As the crosslinkable functional groups, there may be mentioned the above-mentioned acid/acid salt groups and acid/acid salt group precursors and, further, iodo [—I], bromo [—Br], cyano, crosslinkable carboxyl, cyanato, hydroxyl, perfluorovinyl and halocarbonyl groups.

The above-mentioned acid/acid salt groups, organic groups capable of undergoing hydrolysis and thus being converted to carboxyl groups, and acid/acid salt group precursors also include functional groups of the kind consumable in the crosslinking reaction. In the present specification, those functional groups of the kind consumable in the crosslinking reaction which are actually consumed in the crosslinking reaction are referred to as "crosslinkable functional groups" and those which are not consumed in the crosslinking reaction are referred to as "acid/acid salt groups, organic groups capable of undergoing hydrolysis and thus being converted to carboxyl groups, and acid/acid salt group precursors" (hereinafter sometimes referred to as "non-crosslinkable functional groups"). The functional groups of the kind consumable in the crosslinking reaction are, for example, carboxyl groups.

In the present specification, the "crosslinkable carboxyl groups" are carboxyl groups consumed in the crosslinking reaction and, in this respect, are to be conceptually distinguished from those carboxyl groups which are not consumed in the crosslinking reaction but remain as the acid groups mentioned above even after the crosslinking treatment to be described later herein. When the crosslinkable fluoropolymer in the present invention contains both carboxyl groups as acid groups and crosslinkable carboxyl groups, both kinds of carboxyl groups generally occur in total in excess relative to the crosslinking agent (B), so that the carboxyl groups partly remain unconsumed in the crosslinking reaction even in the crosslinking treatment described later herein and the remaining carboxyl groups can function as the acid groups mentioned above. In the present specification, those carboxyl groups which are to be consumed in the crosslinking reaction are the above-mentioned crosslinkable carboxyl groups, and those carboxyl groups remaining unconsumed in the crosslinking reaction are the carboxyl groups as acid groups.

The above-mentioned crosslinkable fluoropolymer is preferably one showing an equivalent weight [EW] of 300 to 5000 after the crosslinking reaction, although the equivalent weight may vary depending on the crosslinking reaction conditions, among others. A more preferred lower limit to the EW after crosslinking reaction is 500, and a more preferred upper limit thereto is 1500. In the present specification, the equivalent weight [EW] after crosslinking reaction indicates the amount of the above-mentioned non-crosslinkable functional groups but does not indicate the amount of the crosslinkable functional groups.

The crosslinkable fluoropolymer is preferably one to be used as a resin, not as a rubber, after the crosslinking reaction.

The fluoropolymer liquid composition of the invention preferably comprises the above-mentioned fluoropolymer liquid (A) and, further, a crosslinking agent (B), although this depends on the crosslinkable functional group species and the crosslinking system to be used.

When the crosslinkable functional groups are crosslinkable carboxyl, cyano, —I and/or —Br groups or moieties, for instance, the liquid composition can be cured without using the crosslinking agent (B). When the crosslinkable functional groups are —I or —Br, curing is possible without using the crosslinking agent (B) but curing may also be effected using the crosslinking agent (B).

As the curing agent (B), there may be mentioned those capable of reacting with carboxyl, alkxoycarbonyl or cyano groups, in particular those used in oxazole crosslinking systems, imidazole crosslinking systems and/or thiazole crosslinking systems. As the crosslinking agent (B) to be used in the oxazole crosslinking systems, imidazole crosslinking systems and/or thiazole crosslinking systems, there may be mentioned, for example, bisdiaminophenyl type crosslinking agents, bisaminophenol type crosslinking agents or bisaminothiophenol type crosslinking agents represented by the general formula (IV):

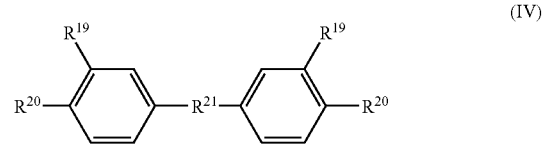

wherein one of $R^{19}$ and $R^{20}$ represents —$NH_2$ and the other represents —$NH_2$, —NH-Ph (Ph representing a phenyl group), —OH or —SH, $R^{21}$ represents —$SO_2$—, —O—, —CO—, an alkylene group containing 1 to 6 carbon atoms, a perfluoroalkylene group containing 1 to 10 carbon atoms or a single bond, bisamidolazone type crosslinking agents represented by the general formula (V):

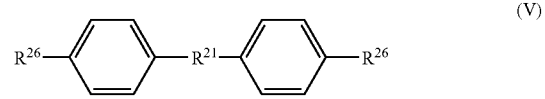

wherein $R^{21}$ is as defined above, $R^{26}$ represents

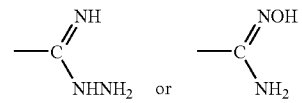

and bisamidoxime type crosslinking agents represented by the general formula (VI) or (VII):

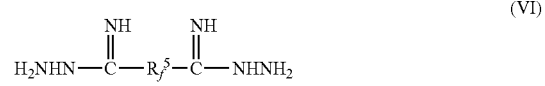

wherein $R_f^5$ represents a perfluoroalkylene group containing 1 to 10 carbon atoms;

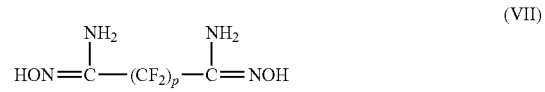

wherein p represents an integer of 1 to 10. These bisaminophenol type crosslinking agents, bisaminothiophenol type crosslinking agents or bisdiaminophenyl type crosslinking agents, among others, have so far been used in crosslinking systems in which nitrile groups serve as crosslinking sites. However, they also react with the carboxyl groups and alkoxycarbonyl groups in the fluoropolymer to form oxazole, thiazole or imidazole rings and thus give crosslinked products.

As the crosslinking agent (B), there may also be mentioned compounds having a plurality of 3-amino-4-hydroxyphenyl groups and/or 3-amino-4-mercaptophenyl groups, or crosslinking agents (B1) represented by the general formula (III):

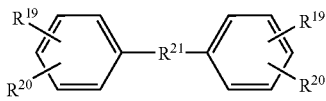

(III)

wherein $R^{19}$, $R^{20}$ and $R^{21}$ are as defined above, for example 2,2-bis(3-amino-4-hydroxyphenyl)hexafluoropropane (generic name: bis(aminophenol) AF), 2,2-bis(3-amino-4-mercaptophenyl)hexafluoropropane, tetraminobenzene, bis(3,4-diaminophenyl)methane, bis(3,4-diaminophenyl)ether and 2,2-bis(3,4-diaminophenyl)hexafluoropropane.

As the crosslinking agent (B), there may further be mentioned polyamine compounds, polyisocyanates, polyepoxidized compounds and the like. The polyamine compounds include, among others, polyamines such as hexamethylenediamine, triethylenetetramine and triethylenediamine; and combinations of polyamine salts and guanidine derivatives. The polyisocyanate compounds include, for example, tolylene diisocyanate, diphenylmethanediisocyanate and hexamethylene diisocyanate. The polyisocyanate compounds may be in the form of prepolymers or in the blocked form making it possible to select the curing temperature. As the crosslinking agent (B), there may further be mentioned, for example, the combined use of an epoxy compound and a quaternary ammonium salt, a quaternary phosphonium salt or a basic compound.

When the above-mentioned crosslinkable functional groups are cyano or crosslinkable carboxyl groups, the crosslinking agent (B) is preferably a crosslinking agent (B1) represented by the general formula (III) given hereinabove.

The groups $R^{19}$ and $R^{20}$ in the general formula (III) are preferably such that each is —$NH_2$ or one of them is —$NH_2$ and the other is —NH-Ph.

When the crosslinkable functional groups each is —I or —Br, the crosslinking agent (B) is preferably a polyfunctional unsaturated compound.

The polyfunctional unsaturated compound is not particularly restricted in kind but may be any one that is reactive with polymer radicals formed upon heating or due to iodine and/or bromine atoms generated upon decomposition of such peroxide compounds as mentioned later herein. Preferred polyfunctional unsaturated compounds are, for example, various diacrylates, trimethylolpropane triacrylate [TMTPA], trimethylolpropane trimethacrylate, triallyl isocyanurate [TAIC], triallyl cyanurate, triallyl trimellitate, pentaerythritol triacrylate, pentaerythritol tetraacrylate, dipentaerythritol hexaacrylate, N,N'-m-phenylenebismaleimide, dipropargyl terephthalate, diallyl phthalate, tetraallyl terephthalamide and triallyl phosphate. Among them, those containing three or more crosslinkable functional groups per molecule are preferred from the viewpoint of easy crosslinking of the crosslinkable fluoropolymer, and triallyl isocyanurate is more preferred.

The usage of the polyfunctional unsaturated compound is about 0.05 to 10 parts by mass per 100 parts by mass of the crosslinkable fluoropolymer. A preferred lower limit thereto is 0.5 part by mass, and a preferred upper limit is 5 parts by mass.

In either of the case of the fluoropolymer liquid composition of the invention occurring as a fluoropolymer solution (AS) and the case of its occurring as a fluoropolymer liquid dispersion (AD), which are to be described later herein, the crosslinking agent (B) preferably amounts to 0.05 to 20% by mass, more preferably to at least 0.1% by mass, relative to the solid matter in the fluoropolymer liquid composition of the invention.

The solid matter in the fluoropolymer liquid composition preferably amounts to 0.5 to 50 parts by mass per 100 parts by mass of the fluoropolymer liquid composition.

The fluoropolymer liquid composition of the invention preferably comprises the fluoropolymer liquid (A) and, further, at least one alcohol (C) selected from the group consisting of methanol, ethanol, propanol and tetrafluoropropanol.

Tetrafluoropropanol is more preferred as the alcohol (C), and 2,2,3,3-tetrafluoropropanol is still more preferred. The alcohol (C) to be used may comprise one single species or two or more species.

The level of addition of the alcohol (C) is preferably 10 to 80% by volume relative to the fluoropolymer liquid (A). By adding the alcohol (C) in an amount within the above range, it becomes possible to adjust the surface tension of the fluoropolymer liquid composition of the invention and, thus, when the fluoropolymer liquid composition of the invention is used for membrane molding, which is to be described later herein, homogeneous membranes can be obtained.

The fluoropolymer liquid composition may comprise the fluoropolymer liquid (A), the alcohol (C) and, further, the above-mentioned crosslinking agent (B).

The fluoropolymer liquid composition of the invention preferably comprises the fluoropolymer liquid (A) and, further, a film-forming auxiliary agent (D). The addition of the film-forming auxiliary agent (D) produces marked improvements in film-forming ability and makes it possible to produce thin membranes by casting.

The film-forming auxiliary agent (D) is preferably an organic liquid which is miscible with water and has a boiling point exceeding 100° C. but not exceeding than 300° C. When the boiling point is not higher than 100° C., the boiling point is generally equal to or lower than that of water and, therefore, when a fluoropolymer liquid dispersion (AD) is to be obtained by incorporating the film-forming auxiliary agent (D) to an fluoropolymer aqueous dispersion (ADA) comprising particles of a crosslinkable fluoropolymer (PD) dispersed in an aqueous dispersion medium and then evaporating the moisture (conversion to an organosol), it is impossible to remove the aqueous dispersion medium while retaining the film-forming auxiliary agent (D). When the boiling point is higher than 300° C., the removal of the film-forming auxiliary agent (D) from the membrane formed using the fluoropolymer liquid composition obtained, if required, tends to become difficult. A preferred lower limit to the boiling point of the film-forming auxiliary agent (D) is 150° C., and a preferred upper limit thereto is 250° C.

When the fluoropolymer liquid (A) in the present invention is an fluoropolymer aqueous dispersion (ADA) or a fluoropolymer solution (AS) having, dissolved in an alcohol/water mixed solvent, a crosslinkable fluoropolymer, the use of the film-forming auxiliary agent (D) is particularly preferred.

When the acid/acid salt group precursor is —$SO_2NR^{22}R^{23}$ ($R^{22}$ and $R^{23}$ being as defined above) or an organic group capable of undergoing hydrolysis and thus being converted to a carboxyl group except for the cases where the crosslinkable fluoropolymer (PS) in the fluoropolymer liquid (A) in the present invention has —$SO_2F$ and occurs as a fluoropolymer solution (AS) having the crosslinkable fluoropolymer (PS) dissolved in a fluorosolvent, the film-forming auxiliary agent (D) preferably comprises (1) a phosphate ester, (2) an ethylene oxide oligomer monohydroxy ether and/or (3) a cyclic amide or cyclic amide derivative.

The film-forming auxiliary agent (D) is preferably used in an amount of 0.1 to 100 parts by mass per part by mass of the crosslinkable fluoropolymer. At levels lower than 0.1 part by mass, the film-forming ability may be insufficient when the fluoropolymer liquid composition obtained is used in molding membranes. At levels exceeding 100 parts by mass, the effect is no more proportional to the addition level and this is economically unfavorable. A more preferred lower limit is 0.5 part by mass, and a more preferred upper limit is 20 parts by mass.

The above-mentioned fluoropolymer liquid composition may comprise the fluoropolymer liquid (A) and the film-forming auxiliary agent (D) and, further, the crosslinking agent (B), or may comprise the fluoropolymer liquid (A) and the crosslinking agent (B) and, further, the film-forming auxiliary agent (D) and the alcohol (C).

The fluoropolymer liquid composition may further also comprise the fluoropolymer liquid (A) and an active substance (E).

As the active substance (E), there may be mentioned, for example, the catalyst described later herein referring to the method of producing a fluorine-containing cured article according to the invention.

The fluoropolymer liquid composition may further comprise the fluoropolymer liquid (A), the active substance (E) and at least one species selected from the group consisting of the crosslinking agent (B), alcohol (C) and film-forming auxiliary agent (D).

The fluoropolymer liquid (A) is preferably a fluoropolymer liquid dispersion (AD), and the solid matter concentration of the fluoropolymer liquid dispersion (AD) is preferably 2 to 80% by mass. When the fluoropolymer liquid composition comprises the fluoropolymer liquid dispersion (AD) and further the crosslinking agent (B), as mentioned above, the crosslinking agent (B) preferably amounts to 0.1 to 20% by mass of the solid matter in the fluoropolymer liquid composition.

The fluoropolymer liquid dispersion (AD) is preferably an fluoropolymer aqueous dispersion (ADA) in which the liquid dispersion medium is an aqueous dispersion medium, and the aqueous dispersion medium is preferably has a water content of 10 to 100% by mass. When the water content of the aqueous dispersion medium is lower than 10% by mass, the dispersibility tends to unfavorably become poor. A more preferred lower limit is 40% by mass.

The "aqueous dispersion medium" so referred to herein is a dispersion medium for the crosslinkable fluoropolymer (PD) and contains water. The aqueous dispersion medium, which comprises water, may further contain a water-soluble organic solvent in addition to water. The aqueous dispersion medium may contain a surfactant, a stabilizer and/or another or other additives generally used in aqueous dispersions.

When the crosslinkable fluoropolymer has acid/acid salt groups, the fluoropolymer aqueous dispersion (ADA) has sufficient dispersion stability even if it is substantially free of any surfactant.

When the crosslinkable fluoropolymer is one obtained by emulsion polymerization, the fluoropolymer aqueous dispersion (ADA) may be the dispersion obtained after polymerization as it is and, when the crosslinkable fluoropolymer contained in the dispersion as obtained after polymerization is a fluoropolymer precursor having acid/acid salt group precursors, the fluoropolymer may be one obtained through the above-mentioned hydrolysis.

The fluoropolymer aqueous dispersion (ADA) is preferably one purified for the purpose of removing inorganic salts, low-molecular-weight impurities, and polymers very low in molecular weight, among others. As the method of purification, there may be mentioned ultrafiltration, for instance.

The fluoropolymer liquid dispersion (AD) may also be the so-called organosol obtained by evaporating the moisture after incorporation of the film-forming auxiliary agent (D) into the fluoropolymer aqueous dispersion (ADA).

The fluoropolymer liquid (A) may also be a fluoropolymer solution (AS), and the crosslinkable fluoropolymer (PS) preferably amounts to 0.1 to 10% by mass of the fluoropolymer liquid composition. When the fluoropolymer liquid composition of the invention comprises the fluoropolymer liquid dispersion (AS) and further the crosslinking agent (B), as mentioned above, the crosslinking agent (B) preferably amounts to 0.1 to 20% by mass of the solid matter in the fluoropolymer liquid composition. When the crosslinkable fluoropolymer (PS) contains acid/acid salt group precursors, the liquid medium serving as a solvent for the crosslinkable polymer (PS) in the fluoropolymer solution (AS) is preferably a fluorosolvent and, when it contains acid/acid salt groups, that liquid medium is preferably an alcohol/water mixed solvent.

The fluorosolvent contains fluorine atoms within the molecule and has a boiling point of 30 to 150° C. So long as it contains fluorine atoms within the molecule and has a boiling point of 30 to 150° C., the fluorosolvent may be either aromatic or aliphatic.

The fluorosolvent is not particularly restricted but includes, among others, chlorofluorocarbons, perfluorobenzene and the like. Preferred among others are linear chlorofluorocarbons represented by the general formula (VIII):

$$C_aH_bCl_cF_{(2a+2-b-c)} \quad \text{(VIII)}$$

wherein a is an integer of 3 to 6, b is an integer of 0 to 2 and c is an integer of 0 to 4, or alicyclic chlorofluorocarbons represented by the general formula (IX):

$$C_aH_bCl_cF_{(2a-b-c)} \quad \text{(IX)}$$

wherein a, b and c are as defined above.

Preferred as the chlorofluorocarbons are those of the general formula (VIII) and general formula (IX) in which b is 0 or 1 and c is 1 or 2. More preferred are mixtures of $CF_3CClFCClFCF_3$ and $CClF_2CClFCF_2CF_3$, a mixture [HCFC-225] of $CF_3CF_2CHCl_2$ and $CClF_2CF_2CHClF$, and $H(CF_2CF_2)_2Cl$.

Perfluorocyclobutane can also be used as the chlorofluorocarbon.

The alcohol to be used in the alcohol/water mixed solvent includes, among others, methanol, ethanol and isopropyl alcohol.

The mixing proportion of the alcohol in the alcohol/water mixed solvent is preferably 10:90 to 90:10 (alcohol:water, % by volume).

The alcohol to be used in the alcohol/water mixed solvent may be the same as the above-mentioned alcohol (C) for improving the film-forming ability. However, said alcohol is essential for dissolving the crosslinkable fluoropolymer (PS) and, in this respect, it is to be conceptually distinguished from the alcohol (C) which is not essential.

The dissolution treatment of the crosslinkable fluoropolymer (PS) in the fluoropolymer solution (AS) is carried out at a temperature not lower than the boiling point of the fluorosolvent or the alcohol/water mixed solvent, preferably at 120° C. or above, more preferably 150° C. or above. Therefore, the dissolution treatment is preferably carried out in a pressure vessel. The time for the dissolution treatment is generally 10 minutes to 300 hours, although it may depend on the dissolution temperature.

The above-mentioned boiling point and dissolution treatment temperature are the values at ordinary temperature and ordinary pressure. The term "ordinary temperature" as used herein indicates ordinary temperature in the ordinary meaning of the term, generally 20-30° C., and the term "ordinary pressure" indicates ordinary pressure in the ordinary meaning of the term, generally 1013 hectopascals (=1 atm.).

The fluoropolymer liquid composition of the invention can be prepared by adding the crosslinking agent (B) after cooling, to ordinary temperature once, the fluoropolymer liquid dispersion (AD) or fluoropolymer solution (AS) prepared with heating. When the fluoropolymer liquid composition of the invention is prepared according to such procedure, there will never arise the problem caused by the addition of the crosslinking agent (B) on the occasion of heating, namely the problem of premature progress of the crosslinking reaction, with the consequent failure to provide the desired fluoropolymer liquid composition.

The fluoropolymer liquid composition of the invention can be suitably used as a proton-conductive material, in particular as a proton-conductive membrane material.

In the method of producing a fluorine-containing cured article according to the invention, such a cured article is produced by applying the fluoropolymer liquid composition of the invention to a substrate or impregnating a porous material with that composition, removing the liquid medium and then carrying out the crosslinking treatment.

The fluorine-containing cured article mentioned above can be one improved in mechanical characteristics, reduced in dimensional changes due to the moisture content and, as a result, improved in durability as compared with the membrane obtained by applying the fluoropolymer liquid composition mentioned above to the substrate or impregnating the porous material with that composition and removing the liquid medium without carrying out the crosslinking treatment.

The method of producing a fluorine-containing cured article according to the invention can generally produce the fluorine-containing cured article in an industrially efficient and stable manner by using the fluoropolymer liquid composition of the invention.

The substrate mentioned above is not particularly restricted but includes, among others, the porous support mentioned above, resin moldings, and metal plates. Electrolyte membranes and porous carbon electrodes, which are used in fuel cells and the like, and the like are preferred.

The above-mentioned porous material may be any organic or inorganic material having a porous structure. Thus, mention may be made of, for example, glass wool, ceramics, alumina, polytetrafluoroethylene webs, stretched porous films obtained by molding polytetrafluoroethylene, carbon, and various polymer-made articles.

Generally, the liquid medium mentioned above can be removed by drying at ordinary temperature and/or with heating. The drying of the membrane obtained by applying the fluoropolymer liquid composition to a substrate or impregnating a porous material with that composition is preferably carried out at least with heating, since when the drying is carried out at ordinary temperature alone, the membrane may be readily dissolved in water or the like. The "heating" in removing the liquid medium is generally carried out at 80 to 400° C., preferably at 200° C. or above.

The fluorine-containing cured article may comprise a substrate or porous material. When it is applied to a substrate, it can be obtained in the form of a substrate-free thin membrane by peeling it off from the substrate surface, for example by immersion in water.

The crosslinking treatment preferably consists in crosslinking treatment using high energy.

The crosslinking treatment using high energy is preferably carried out by heating, radiation exposure, electron beam irradiation or photoirradiation. Preferably, the treatment is carried out by heating in view of the ready availability of the apparatus and the ease of handling.

The heating in the above crosslinking treatment is generally carried out in an oven or under pressing at 100 to 400° C. for 1 minute to 10 hours.

When the crosslinking treatment is carried out using a peroxide compound, which is to be described later herein, as a crosslinking reaction initiator, the treatment is preferably carried out in the substantial absence of oxygen, more preferably in a nitrogen atmosphere. In the presence of oxygen, the radicals generated upon cleavage of the peroxide compound are captured by oxygen and the progress of the crosslinking tends to be prevented accordingly.

The method of producing a fluorine-containing cured article according to the invention may also comprise applying the fluoropolymer liquid composition of the invention to a substrate or impregnating a porous material with that composition, removing the liquid medium and carrying out the crosslinking treatment using a peroxide compound as a crosslinking reaction initiator to thereby produce a fluorine-containing cured article.

When the crosslinking treatment is carried out using a peroxide compound as a crosslinking reaction initiator, the fluoropolymer liquid composition is preferably one in which the crosslinkable functional group is —I or —Br and a polyfunctional unsaturated compound is used as the crosslinking agent (B). Triallyl isocyanurate is preferred as the polyfunctional unsaturated compound.

The peroxide compound is preferably one showing an appropriate rate of decomposition at a temperature not lower than the boiling point of the liquid medium but not higher than the decomposition temperature of the crosslinkable fluoropolymer and having an evaporation temperature such that it will not easily evaporate and, as such, there may be mentioned di-tert-butylperoxyalkanes, for example 2,5-dimethyl-2,5-di(tert-butylperoxy)hexane.

The level of addition of the peroxide compound is preferably 0.001 to 5 parts by mass per 100 parts by mass of the fluoropolymer. At levels below 0.001 part by mass per 100 parts by mass of the fluoropolymer, the crosslinking reaction may proceed only to an insufficient extent. At levels exceeding 5 parts by mass per 100 parts by mass of the fluoropolymer, the amount of the peroxide residues becomes great, possibly leading to a decrease in strength. A more preferred lower limit to the level of addition of the peroxide compound is 0.01 part by mass, and a more preferred upper limit thereto is 1 part by mass, per 100 parts by mass of the fluoropolymer.

It is desirable that the above-mentioned application or impregnation be carried out at a relatively low temperature and then the crosslinking treatment be carried out by raising the temperature. The application or impregnation and the crosslinking treatment may be repeated alternately.

The fluorine-containing cured article can be used, for example, as a proton-conductive membrane, in particular an electrolyte membrane or an ion exchange membrane, without any particular restriction.

When the fluorine-containing cured article mentioned above is used as an electrolyte membrane, for instance, it may have a membrane thickness of 5 to 200 µm. A preferred lower limit to the above membrane thickness is 10 μm, and a preferred upper limit to the membrane thickness is 50 μm.

When used as an electrolyte membrane, for instance, the fluorine-containing cured article mentioned above shows only a low membrane expansion rate even after a long period of immersion. For example, a fluorine-containing cured article obtained by crosslinking a crosslinkable fluoropolymer having a perfluoro(ethyl vinyl ether)sulfonyl chloride monomer unit content of 18 mole percent, when immersed in an aqueous medium for about 15 hours, the percentage of membrane expansion is generally not higher than 10% by volume as compared with the volume before that immersion.

The fluorine-containing cured article mentioned above can be used, without any particular restriction, as an electrolyte membrane in a solid polymer electrolyte fuel cell, a membrane in a lithium cell, a membrane for electrolysis of sodium chloride, a membrane for electrolysis of water, a membrane for electrolysis of a hydrohalic acid, a membrane in an oxygen concentrator, a membrane in a humidity sensor, or a membrane for a gas sensor, for instance.

The fluorine-containing cured article obtained by the method of producing a fluorine-containing cured article according to the invention may be an immobilized active substance cured article containing an active substance (E).

The active substance/material (E) is not particularly restricted but may be any one capable of showing its activity in the immobilized active substance cured article. It can be adequately selected according to the intended object of the immobilized active substance cured article of the invention. For example, a catalyst can be suitably used.

The catalyst is not particularly restricted but may be any of those generally used as electrode catalysts. For example, there may be mentioned metals containing platinum, ruthenium or the like; and organic metal complexes generally containing one or more central metal species in which at least one of the central metal species is platinum or ruthenium. The platinum- or ruthenium-containing metals are preferably platinum-containing metals, although they may also be ruthenium-containing metals, for example ruthenium as a simple substance. The platinum-containing metals are not particularly restricted but include, among others, platinum as a simple substance (platinum black); and platinum-ruthenium alloys. The catalyst is generally used in a form carried on a support such as silica, alumina or carbon.

The immobilized active substance cured article mentioned above may further comprise electrodes and/or other constituents constituting a solid polymer electrolyte fuel cell, and preferably is an electrode body for a solid polymer electrolyte fuel cell.

The fluorine-containing cured article mentioned above can be used in the form of a membrane electrode assembly (MEA) which is an electrode body for a solid polymer electrolyte fuel cell joining together with an electrolyte membrane.

EFFECTS OF THE INVENTION

The fluoropolymer liquid composition of the invention, which has the constitution described hereinabove, can produce cured articles excellent in mechanical characteristics and durability and undergoing only slight dimensional changes depending on the moisture content in an industrially efficient and stable manner.

BEST MODES FOR CARRYING OUT THE INVENTION

The following examples illustrate the present invention more specifically. These examples are, however, by no means limitative of the scope of the present invention.

Example 1

A 500-ml SUS stainless steel autoclave was charged with 227.5 g of perfluorocyclobutane as a solvent, 168.2 g of perfluoro(ethyl vinyl ether)sulfonyl fluoride (PFSF, $CF_2\!\!=\!\!CFOCF_2CF_2SO_2F$) and 16.1 g of $CF_2\!\!=\!\!CFOCF_2CF(CF_3)OCF_2CF_2CN$ (CNVE), followed by deaeration. With stirring at 800 rpm and under the temperature condition of 30° C., tetrafluoroethylene [TFE] was introduced under pressure to a total pressure of 0.33 MPa and, then, 3.56 g of a 8% (by mass) solution of the initiator di(ω-hydroperfluorohexanoyl) peroxide in perfluorohexane was fed under pressure to initiate the polymerization reaction. During reaction, TFE was introduced from outside the system to maintain the pressure at constant level, and PFSF was introduced intermittently under pressure, in a total amount of 7.0 g, to compensate the PFSF consumption in the reaction. After the lapse of 2 hours, the unreacted TFE was discharged out of the system to thereby terminate the polymerization reaction. The state of stirring in the system was good. After completion of the polymerization reaction, 250 ml of chloroform was added, and the resulting mixture was stirred for 30 minutes. Then, using a centrifuge, solid-liquid separation was effected, 250 ml of chloroform was added to the solid obtained, and the mixture was stirred for 30 minutes. The polymer was washed by repeating this procedure three times. Then, the washed polymer was deprived of the chloroform under vacuum at 120° C., to give 21.8 of a copolymer (copolymer a). The copolymer a obtained had a PFSF content of 16.2 mole percent and a CNVE content of 1.1 mole percent, as estimated from NMR spectrometry in a molten state at 300° C.

$H(CF_2)_4Cl$ (400 ml) was added, as a fluorosolvent, to 4 g of the copolymer a obtained and the whole was introduced into a 600-ml SUS stainless steel pressure vessel. After maintaining at 150° C. for 12 hours, the contents were taken out, whereby a colorless transparent solution was obtained. A 32-mg portion of 2,2-bis[3-amino-4-(N-phenylamino)phenyl]hexafluoropropane (AFTA-Ph), a crosslinking agent synthesized by the method described in Journal of Polymer Science, Polymer Chemistry Edition, Vol. 20, pages 2381-2393 (1982), was admixed with the solution obtained. A polytetrafluoroethylene [PTFE] porous membrane (product of Daikin Industries) was immersed in the solution obtained, then air-dried for 30 minutes, and dried in an oven set at 80 to 100° C. for 30 minutes. Then, the thus-formed coated membrane was further baked at 200° C. for 10 minutes, then immersed in pure water and the thin membrane was peeled off from the supporting glass plate. The thin membrane obtained had a membrane thickness of 15 μm.

Example 2

An ice-cooled 300-ml autoclave equipped with a stirrer was charged with 150 ml of pure water, 3 g of ammonium perfluorooctanoate, 37 g of perfluoro(ethyl vinyl ether)sulfonyl fluoride (PFSF, $CF_2\!\!=\!\!CFOCF_2CF_2SO_2F$), 0.18 g of $I(CF_2)_4I$ and 60 mg of ammonium persulfate and, after sufficient substitution of the inside space with tetrafluoroethylene [TFE], the inside was pressurized to 0.2 MPa with TFE, the system inside temperature was rapidly raised to 60° C., and TFE was additionally fed until arrival at a pressure of 0.8 MPa to thereby initiate the polymerization. The reaction was continued while additionally feeding TFE to compensate the decrease in pressure and maintain the pressure at 0.8 to 0.75 MPa. After the lapse of 6 hours, the autoclave was rapidly cooled to 20° C. or below and the unreacted TFE was released; the polymerization was thus stopped. A slightly turbid, transparent fluoropolymer aqueous dispersion (240 g) was obtained.

A portion of the fluoropolymer aqueous dispersion (BDA-1) obtained was coagulated with nitric acid, and the solid was washed with water and dried. The thus-obtained crosslinkable fluoropolymer had an iodine content of 0.1% and had a PFSF content of 18.5 mole percent as estimated from NMR spectrometry in a molten state at 300° C.

A 50-ml portion of the fluoropolymer aqueous dispersion obtained was diluted two-fold with pure water, the dilution was stirred in a 200-ml beaker, the temperature was raised to 55° C., and the —$SO_2F$ moieties which the fluoropolymer precursor had were hydrolyzed while maintaining the pH at 10 or above by adding dropwise a 10% (by mass) aqueous solution of potassium hydroxide. After about 3 hours, the pH no more lowered. However, the hydrolysis procedure was continued for further 2 hours and then finished. During the procedure, no fluoropolymer deposition was confirmed by the eye. The reaction mixture obtained was deprived of low-molecular-weight substances and purified and concentrated by centrifugal ultracentrifugation using Centriprep YM-10 (product of Amicon). The fluoropolymer dispersion obtained had a fluoropolymer concentration of 32% by mass. In 10 ml of the fluoropolymer aqueous dispersion obtained, there were incorporated, with stirring, 12 ml of triethyl phosphate, 5 ml of isopropanol, 50 mg of Perhexa 25B (product of NOF Corp.) and 150 mg of triallyl isocyanurate (TAIC) (product of Nippon Kasei Chemical). The thus-obtained fluoropolymer dispersion composition was spread on a glass sheet and, after 30 minutes of air-drying, dried in an oven set at 80° C. for 30 minutes, to give a coat film. Then, the glass sheet with the coat film was sealed with an aluminum foil and baked at 170° C. for 10 minutes. After cooling, the glass sheet with the coat film was taken out of the aluminum foil and immersed in pure water, the thin membrane was peeled off from the glass sheet, immediately taken out of the water and air-dried at room temperature. The thin membrane had a thickness of 15 μm. The thin membrane obtained was immersed in pure water at room temperature for 15 hours, whereupon it showed a percentage of membrane expansion (volume ratio) of not higher than 10%.

Comparative Example 1

The procedure of Example 2 was followed in the same manner except that the use of Perhexa 25B and TAIC was omitted. The membrane obtained showed a percentage of membrane expansion of 20%.

Example 3

The procedure of Example 2 was followed in the same manner except that the amount of perfluoro(ethyl vinyl ether) sulfonyl fluoride (PFSF, $CF_2$=$CFOCF_2CF_2SO_2F$) was increased to 49 g. The PFSF content estimated from NMR spectrometry in a molten state at 300° C. was 23.4 mole percent, and the percentage of membrane expansion was 160%.

Comparative Example 2

The procedure of Example 3 was followed in the same manner except that the use of Perhexa 25B and TAIC was omitted. The thin membrane obtained, when immersed in pure water at room temperature for 15 hours, was dissolved in water.

Example 4

The same autoclave as used in Example 3 was charged with 50 ml of the fluoropolymer dispersion obtained in Example 3 after removal of low-molecular-weight substances and purification and concentration by centrifugal ultrafiltration, 100 ml of pure water and 20 mg of ammonium persulfate and, after sufficiently purging the reaction vessel with hexafluoropropylene [HFP] gas, the pressure was increased to 1 MPa with 20 g of HFP gas and TFE at 4° C., and the temperature was then raised to 60° C. to initiate the block polymerization for the production of a TFE/HFP copolymer. After the pressure drop from 1.6 MPa at the initial to 1.1 MPa in 5 hours, the temperature was lowered to 20° C. or below, and the pressure was released to give 165 ml of an fluoropolymer aqueous dispersion. The reaction mixture obtained was further subjected to centrifugal ultrafiltration using Centriprep YM-10 (product of Amicon) for the removal of low-molecular-weight substances and purification and concentration of the fluoropolymer. In 10 ml of the fluoropolymer aqueous dispersion obtained, there were incorporated, with stirring, 12 ml of triethyl phosphate, 5 ml of isopropanol, 50 mg of Perhexa 25B (product of NOF Corp.) and 150 mg of triallyl isocyanurate (TAIC) (product of Nippon Kasei Chemical). The thus-obtained fluoropolymer dispersion composition was spread on a glass sheet and, after 30 minutes of air-drying, dried in an oven set at 80° C. for 30 minutes, to give a coat film. Then, the glass sheet with the coat film was sealed with an aluminum foil and baked at 170° C. for 10 minutes, followed by further 5 minutes of heating at 295° C. After cooling, the glass sheet with the coat film was taken out of the aluminum foil and immersed in pure water, the thin membrane was peeled off from the glass sheet, immediately taken out of the water and air-dried at room temperature. The thin membrane had a thickness of 15 μm. The thin membrane obtained was immersed in pure water at room temperature for 15 hours; the percentage of membrane expansion was 0%. The ion exchange capacity of the membrane obtained was determined by titrimetry and found to be 870 g/equivalent.

Example 5

The procedure of Example 3 was followed in the same manner except that 2 g of $CF_2$=$CFOCF_2CF_2I$ was used in lieu of $I(CF_2)_4I$. The PFSF content estimated from NMR spectrometry in molten state at 300° C. was 23.0 mole percent, and the percentage of membrane expansion was 5%.

INDUSTRIAL APPLICABILITY

The fluoropolymer liquid composition of the invention can be suitably used in the production of electrolyte membranes, among others.

The invention claimed is:

1. A fluoropolymer liquid composition comprising a fluoropolymer liquid (A) which comprises a liquid medium and a crosslinkable functional group-containing crosslinkable fluoropolymer, wherein said fluoropolymer liquid (A) is a fluoropolymer liquid dispersion (AD) having, dispersed in a liquid dispersion medium, particles of a crosslinkable fluoropolymer (PD) containing acid/acid salt groups or organic groups capable of undergoing hydrolysis and thus being converted to carboxyl groups, or a fluoropolymer solution (AS) having, dissolved in a fluorosolvent or an alcohol/water mixed solvent, a crosslinkable fluoropolymer (PS) containing acid/acid salt groups or acid/acid salt groups precursors;

said acid/acid salt groups are sulfonic acid groups, carboxyl groups or groups of the formula $-SO_2NR^2R^3$, $-SO_3NR^4R^5R^6R^7$, $-SO_3M^1{}_{1/L}$, $-COONR^8R^9R^{10}R^{11}$ or $-COOM^2{}_{1/L}$, wherein $R^2$ represents a hydrogen atom or $M^5{}_{1/L}$, $R^3$ represents an alkyl group or a sulfonyl-containing group, $R^4, R^5, R^6, R^7, R^8, R^9, R^{10}$ and $R^{11}$ are the same or different and each represents a hydrogen atom or an alkyl group, and $M^1$, $M^2$ and $M^5$ each represents a metal having a valence of L, said metal having a valence of L being a metal belonging to the group 1, 2, 4, 8, 11, 12 or 13 of the periodic table; and said acid/acid salt groups precursors are $-SO_2F$, $-SO_2NR^{22}R^{23}$ (wherein $R^{22}$ and $R^{23}$ are the same or different and each represents an alkyl group) or organic groups capable of undergoing hydrolysis and thus being converted to carboxyl groups, wherein the crosslinkable functional group is a cyano group, $-I$ or $-Br$, wherein said fluoropolymer liquid composition comprises the fluoropolymer liquid (A) and, further, a crosslinking agent (B), said crosslinking agent (B) being;

a crosslinking agent (B1) represented by the general formula (III):

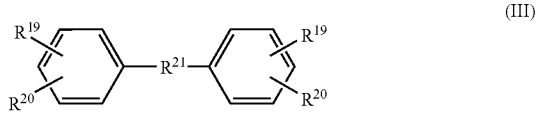

(III)

wherein one of $R^{19}$ and $R^{20}$ represents $-NH_2$ and the other represents $-NH_2$, $-NH$-$Ph$, $-OH$ or $-SH$, Ph represents phenyl group and $R^{21}$ represents $-SO_2-$, $-O-$, $-CO-$, an alkylene group containing 1 to 6 carbon atoms, a perfluoroalkylene group containing 1 to 10 carbon atoms or a single bond, or a polyfunctional unsaturated compound.

2. The fluoropolymer liquid composition according to claim 1,
wherein the crosslinkable functional group is a cyano group,
said crosslinking agent (B) being a crosslinking agent (B1) represented by the general formula (III):

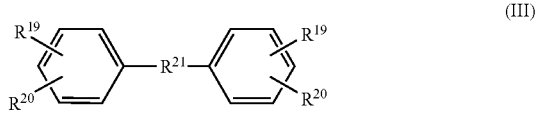

(III)

wherein one of $R^{19}$ and $R^{20}$ represents $-NH_2$ and the other represents $-NH_2$, $-NH$-$Ph$, $-OH$ or $-SH$, Ph represents phenyl group and $R^{21}$ represents $-SO_2-$, $-O-$, $-CO-$, an alkylene group containing 1 to 6 carbon atoms, a perfluoroalkylene group containing 1 to 10 carbon atoms or a single bond.

3. The fluoropolymer liquid composition according to claim 2,
wherein $R^{19}$ and $R^{20}$ each is $-NH_2$ or one of them is $-NH_2$ and the other is $-NH$-Ph.

4. The fluoropolymer liquid composition according to claim 1,
wherein the crosslinkable functional group is $-I$ or $-Br$, said crosslinking agent (B) being a polyfunctional unsaturated compound.

5. The fluoropolymer liquid composition according to claim 4,
wherein the polyfunctional unsaturated compound is triallyl isocyanurate.

6. The fluoropolymer liquid composition according to claim 1,
wherein said acid/acid salt groups, said acid/acid salt groups precursors, and said organic groups capable of undergoing hydrolysis and thus being converted to carboxyl groups are each bound to a fluoroether side chain represented by the general formula (I):

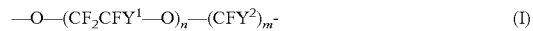

$-O-(CF_2CFY^1-O)_n-(CFY^2)_m-$ (I)

wherein $Y^1$ represents a fluorine or chlorine atom or a perfluoroalkyl group, n represents an integer of 0 to 3, the n atoms/groups of $Y^1$ may be the same or different, $Y^2$ represents a fluorine or chlorine atom, m represents an integer of 1 to 5, and the m atoms of $Y^2$ may be the same or different; and
wherein said fluoroether side chain is bound, via ether bonding, to a carbon atom constituting a perfluoroethylene unit in the main chain of the crosslinkable fluoropolymer.

7. The fluoropolymer liquid composition according to claim 1,
wherein said crosslinkable fluoropolymer is a fluoropolymer precursor obtained by polymerizing a fluorovinyl ether derivative represented by the general formula (II):

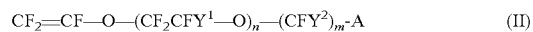

$CF_2=CF-O-(CF_2CFY^1-O)_n-(CFY^2)_m-A$ (II)

wherein $Y^1$ represents a fluorine or chlorine atom or a perfluoroalkyl group, n represents an integer of 0 to 3, the n atoms/groups of $Y^1$ may be the same or different, $Y^2$ represents a fluorine or chlorine atom, m represents an integer of 1 to 5, the m atoms of $Y^2$ may be the same or different, and A represents $-SO_2X$, $-COOM^3{}_{1/L}$ or an organic group capable of undergoing hydrolysis and thus being converted to a carboxyl group; X represents a halogen atom, $-OM^4{}_{1/L}$, $-NR^{13}R^{14}$ or $-ONR^{15}R^{16}R^{17}R^{18}$, wherein $R^{13}$ and $R^{14}$ are the same or different and each represents a hydrogen atom, an alkali metal, an alkyl group or a sulfonyl-containing group, $M^3$ and $M^4$ each represents a metal having a valence of L, and $R^{15}$, $R^{16}$, $R^{17}$ and $R^{18}$ are the same or different and each represents a hydrogen atom or an alkyl group containing 1 to 4 carbon atoms,
or one derived from said fluoropolymer precursor.

8. The fluoropolymer liquid composition according to claim 7,
wherein said fluoropolymer precursor is an at least binary copolymer obtained by polymerization of said fluorovinyl ether derivative and a fluoroethylenic monomer.

9. The fluoropolymer liquid composition according to claim 7,
wherein $Y^1$ is a trifluoromethyl group, $Y^2$ is a fluorine atom, n is 0 or 1, and m is 2.

10. The fluoropolymer liquid composition according to claim 1,
wherein the organic groups capable of undergoing hydrolysis and thus being converted to carboxyl groups are —$COOR^{12}$, in which $R^{12}$ represents an alkyl group, or —$CONR^{24}R^{25}$, in which $R^{24}$ and $R^{25}$ are the same or different and each represents an alkyl group or a hydrogen atom.

11. The fluoropolymer liquid composition according to claim 1,
said fluoropolymer liquid composition comprising the fluoropolymer liquid (A) and, further, at least one alcohol (C) selected from the group consisting of methanol, ethanol, propanol and tetrafluoropropanol.

12. The fluoropolymer liquid composition according to claim 1,
said fluoropolymer liquid composition comprising the fluoropolymer liquid (A) and, further, a film-forming auxiliary agent (D),
said film-forming auxiliary agent (D) being an organic liquid miscible with water and having a boiling point exceeding 100° C. but not exceeding 300° C.

13. The fluoropolymer liquid composition according to claim 12,
wherein the acid/acid salt groups precursors each is —$SO_2NR^{22}R^{23}$ or a group capable of undergoing hydrolysis and thus being converted to a carboxyl group, $R^{22}$ and $R^{23}$ being as defined above and
wherein the film-forming auxiliary agent (D) is (1) a phosphate ester, (2) an ethylene oxide oligomer monohydroxy ether and/or a cyclic amide or a cyclic amide derivative.

14. The fluoropolymer liquid composition according to claim 1, said fluoropolymer liquid composition comprising the fluoropolymer liquid (A) and, further, an active substance (E).

15. The fluoropolymer liquid composition according to claim 1,
wherein said crosslinkable fluoropolymer contains sulfonic acid groups or carboxyl groups, or salt forms of sulfonic acid groups or carboxyl groups, said crosslinkable fluoropolymer is obtained by hydrolysis, in the presence of water, of groups of the formula —$SO_2X^1$ or —$COZ^1$ contained in the fluoropolymer precursor, $X^1$ representing a halogen atom and $Z^1$ representing an alkoxyl group.

16. The fluoropolymer liquid composition according to claim 1,
wherein the fluoropolymer liquid (A) is a fluoropolymer liquid dispersion (AD) and
wherein the solid matter concentration of said fluoropolymer liquid dispersion (AD) is 2 to 80% by mass.

17. The fluoropolymer liquid composition according to claim 16,
the fluoropolymer liquid dispersion (AD) being a fluoropolymer aqueous dispersion (ADA) in which the liquid dispersion medium is an aqueous dispersion medium,
said aqueous dispersion medium having a water content of 10 to 100% by mass.

18. The fluoropolymer liquid composition according to claim 1,
wherein the fluoropolymer liquid (A) is a fluoropolymer solution (AS) and
wherein the crosslinkable fluoropolymer (PS) amounts to 0.1 to 10% by mass of said fluoropolymer liquid composition.

19. A method of producing a fluorine-containing cured article,
in which the fluoropolymer liquid composition according to claim 1 is applied to a substrate or a porous material is immersed in said composition, the liquid medium is then removed and a crosslinking treatment is carried out to produce said fluorine-containing cured article.

20. A method of producing a fluorine-containing cured article,
in which the fluoropolymer liquid composition according to claim 19 is applied to a substrate or a porous material is immersed in said composition, the liquid medium is then removed and a crosslinking treatment is carried out using a peroxide compound as a crosslinking reaction initiator to produce said fluorine-containing cured article.

21. The method of producing a fluorine-containing cured article according to claim 19,
wherein the crosslinking treatment is a crosslinking treatment using high energy.

22. The method of producing a fluorine-containing cured article according to claim 21,
wherein the crosslinking treatment using high energy is carried out by heating, exposure to radiation, electron beam irradiation or photoirradiation.

23. The method of producing a fluorine-containing cured article according to claim 19,
wherein said fluorine-containing cured article comprises an immobilized active substance cured article containing an active substance (E).

24. The method of producing a fluorine-containing cured article according to claim 23,
wherein the active substance (E) is a catalyst.

25. The method of producing a fluorine-containing cured article according to claim 24,
wherein the catalyst is a platinum-containing metal.

26. The method of producing a fluorine-containing cured article according to claim 23,
wherein the immobilized active substance cured article is an electrode body for a solid polymer electrolyte fuel cell.

27. The method of producing a fluorine-containing cured article according to claim 19,
wherein said fluorine-containing cured article is an electrolyte membrane.

28. The method of producing a fluorine-containing cured article according to claim 23,
wherein said fluorine-containing cured article is a membrane electrode assembly (MEA) which is the electrode body for a solid polymer electrolyte fuel cell joining together with the electrolyte membrane.

29. A fluoropolymer liquid composition comprising a fluoropolymer liquid (A) which comprises a liquid medium and a crosslinkable functional group-containing crosslinkable fluoropolymer,
wherein said fluoropolymer liquid (A) is a fluoropolymer liquid dispersion (AD) having, dispersed in a liquid dispersion medium, particles of a crosslinkable fluoropolymer (PD) containing acid/acid salt groups or organic groups capable of undergoing hydrolysis and thus being converted to carboxyl groups, or a fluoropolymer solution (AS) having, dissolved in a fluorosolvent or an alcohol/water mixed solvent, a crosslinkable fluoropolymer (PS) containing acid/acid salt groups or acid/ acid salt groups precursors;
said acid/acid salt groups are sulfonic acid groups, carboxyl groups or groups of the formula —$SO_2NR^2R^3$, —SO₃NR⁴R⁵R⁶R⁷, —SO₃M¹$_{1/L}$, —COONR⁸R⁹R¹⁰R¹¹ or —COOM²$_{1/L}$, wherein R² represents a hydrogen atom or M⁵$_{1/L}$, R³ represents an alkyl group or an sulfonyl-containing group, R⁴, R⁵, R⁶, R⁷, R⁸, R⁹, R¹⁰ and R¹¹ are the same or different and each represents a hydrogen atom or an alkyl group, and M¹, M² and M⁵ each represents a metal having a valence of L, said metal having a valence of L being a metal belonging to the group 1, 2, 4, 8, 11, 12 or 13 of the periodic table; and said acid/acid salt groups precursors are —SO₂F, —SO₂NR²²R²³ (wherein R²² and R²³ are the same or different and each represents an alkyl group) or organic groups capable of undergoing hydrolysis and thus being converted to carboxyl groups, wherein the crosslinkable functional group is a cyano group, —I or —Br, said fluoropolymer liquid composition comprising the fluoropolymer liquid (A) and, further, a film-forming auxiliary agent (D), said film-forming auxiliary agent (D) being an organic liquid miscible with water and having a boiling point exceeding 100° C. but not exceeding 300° C.

30. The fluoropolymer liquid composition according to claim 29,
wherein said acid/acid salt groups, said acid/acid salt groups precursors, and said organic groups capable of undergoing hydrolysis and thus being converted to carboxyl groups are each bound to a fluoroether side chain represented by the general formula (I):

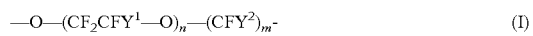

—O—(CF₂CFY¹—O)$_n$—(CFY²)$_m$-    (I)

wherein Y¹ represents a fluorine or chlorine atom or a perfluoroalkyl group, n represents an integer of 0 to 3, the n atoms/groups of Y¹ may be the same or different, Y² represents a fluorine or chlorine atom, m represents an integer of 1 to 5, and the m atoms of Y² may be the same or different; and wherein said fluoroether side chain is bound, via ether bonding, to a carbon atom constituting a perfluoroethylene unit in the main chain of the crosslinkable fluoropolymer.

31. The fluoropolymer liquid composition according to claim 29,
wherein said crosslinkable fluoropolymer is a fluoropolymer precursor obtained by polymerizing a fluorovinyl ether derivative represented by the general formula (II):

CF₂=CF—O—(CF₂CFY¹—O)$_n$—(CFY²)$_m$-A    (II)

wherein Y¹ represents a fluorine or chlorine atom or a perfluoroalkyl group, n represents an integer of 0 to 3, the n atoms/groups of Y¹ may be the same or different, Y² represents a fluorine or chlorine atom, m represents an integer of 1 to 5, the m atoms of Y² may be the same or different, and A represents —SO₂X, —COOM³$_{1/L}$ or an organic group capable of undergoing hydrolysis and thus being converted to a carboxyl group; X represents a halogen atom, —OM⁴$_{1/L}$, —NR¹³R¹⁴OR—ONR¹⁵R¹⁶R¹⁷R¹⁸, wherein R¹³ and R¹⁴ are the same or different and each represents a hydrogen atom, an alkali metal, an alkyl group or a sulfonyl-containing group, M³ and M⁴ each represents a metal having a valence of L, and R¹⁵, R¹⁶, R¹⁷ and R¹⁸ are the same or different and each represents a hydrogen atom or an alkyl group containing 1 to 4 carbon atoms,
or one derived from said fluoropolymer precursor.

32. The fluoropolymer liquid composition according to claim 31,
wherein said fluoropolymer precursor is an at least binary copolymer obtained by polymerization of said fluorovinyl ether derivative and a fluoroethylenic monomer.

33. The fluoropolymer liquid composition according to claim 31,
wherein Y¹ is a trifluoromethyl group, Y² is a fluorine atom, n is 0 or 1, and m is 2.

34. The fluoropolymer liquid composition according to claim 29,
wherein the organic groups capable of undergoing hydrolysis and thus being converted to carboxyl groups are —COOR¹², in which R¹² represents an alkyl group, or —CONR²⁴R²⁵, in which R²⁴ and R²⁵ are the same or different and each represents an alkyl group or a hydrogen atom.

35. The fluoropolymer liquid composition according to claim 29,
said fluoropolymer liquid composition comprising the fluoropolymer liquid (A) and, further, at least one alcohol (C) selected from the group consisting of methanol, ethanol, propanol and tetrafluoropropanol.

36. The fluoropolymer liquid composition according to claim 29,
wherein the acid/acid salt groups precursors each is —SO₂NR²²R²³ or a group capable of undergoing hydrolysis and thus being converted to a carboxyl group, R²² and R²³ being as defined above and
wherein the film-forming auxiliary agent (D) is (1) a phosphate ester, (2) an ethylene oxide oligomer monohydroxy ether and/or a cyclic amide or a cyclic amide derivative.

37. The fluoropolymer liquid composition according to claim 29, said fluoropolymer liquid composition comprising the fluoropolymer liquid (A) and, further, an active substance (E).

38. The fluoropolymer liquid composition according to claim 29,
wherein said crosslinkable fluoropolymer contains sulfonic acid groups or carboxyl groups, or salt forms of sulfonic acid groups or carboxyl groups, said crosslinkable fluoropolymer is obtained by hydrolysis, in the presence of water, of groups of the formula —SO₂X¹ or —COZ¹ contained in the fluoropolymer precursor, X¹ representing a halogen atom and Z¹ representing an alkoxyl group.

39. The fluoropolymer liquid composition according to claim 29,
wherein the fluoropolymer liquid (A) is a fluoropolymer liquid dispersion (AD) and
wherein the solid matter concentration of said fluoropolymer liquid dispersion (AD) is 2 to 80% by mass.

40. The fluoropolymer liquid composition according to claim 39,
the fluoropolymer liquid dispersion (AD) being an fluoropolymer aqueous dispersion (ADA) in which the liquid dispersion medium is an aqueous dispersion medium,
said aqueous dispersion medium having a water content of 10 to 100% by mass.

41. The fluoropolymer liquid composition according to claim 29,
wherein the fluoropolymer liquid (A) is a fluoropolymer solution (AS) and wherein the crosslinkable fluoropolymer (PS) amounts to 0.1 to 10% by mass of said fluoropolymer liquid composition.

42. A method of producing a fluorine-containing cured article,
in which the fluoropolymer liquid composition according to claim 29 is applied to a substrate or a porous material is immersed in said composition, the liquid medium is then removed and a crosslinking treatment is carried out to produce said fluorine-containing cured article.

43. A method of producing a fluorine-containing cured article,
in which the fluoropolymer liquid composition according to claim 42 is applied to a substrate or a porous material is immersed in said composition, the liquid medium is then removed and a crosslinking treatment is carried out using a peroxide compound as a crosslinking reaction initiator to produce said fluorine-containing cured article.

44. The method of producing a fluorine-containing cured article according to claim 42,
wherein the crosslinking treatment is a crosslinking treatment using high energy.

45. The method of producing a fluorine-containing cured article according to claim 44,
wherein the crosslinking treatment using high energy is carried out by heating, exposure to radiation, electron beam irradiation or photoirradiation.

46. The method of producing a fluorine-containing cured article according to claim 42,
wherein said fluorine-containing cured article comprises an immobilized active substance cured article containing an active substance (E).

47. The method of producing a fluorine-containing cured article according to claim 46,
wherein the active substance (E) is a catalyst.

48. The method of producing a fluorine-containing cured article according to claim 47,
wherein the catalyst is a platinum-containing metal.

49. The method of producing a fluorine-containing cured article according to claim 46,
wherein the immobilized active substance cured article is an electrode body for a solid polymer electrolyte fuel cell.

50. The method of producing a fluorine-containing cured article according to claim 42,
wherein said fluorine-containing cured article is an electrolyte membrane.

51. The method of producing a fluorine-containing cured article according to claim 46,
wherein said fluorine-containing cured article is a membrane electrode assembly (MEA) which is the electrode body for a solid polymer electrolyte fuel cell joining together with the electrolyte membrane.

* * * * *